United States Patent
Maier

(10) Patent No.: US 9,664,299 B2
(45) Date of Patent: May 30, 2017

(54) DEVICE FOR REGULATING THE PRESSURE AND/OR MASS FLOW FOR A SPACE PROPULSION SYSTEM

(71) Applicant: Astrium GmbH, Taufkirchen (DE)

(72) Inventor: Thomas Maier, Lauffen (DE)

(73) Assignee: Astrium GmbH, Taufkirchen (DE)

(*) Notice: Subject to any disclaimer, the term of this patent is extended or adjusted under 35 U.S.C. 154(b) by 304 days.

(21) Appl. No.: 14/017,815

(22) Filed: Sep. 4, 2013

(65) Prior Publication Data
US 2014/0061517 A1    Mar. 6, 2014

(30) Foreign Application Priority Data
Sep. 5, 2012 (DE) .......................... 10 2012 017 501

(51) Int. Cl.
*G05D 7/06*    (2006.01)
*F16K 31/00*   (2006.01)
(Continued)

(52) U.S. Cl.
CPC ............ *F16K 31/004* (2013.01); *F16K 31/08* (2013.01); *G05D 7/0641* (2013.01);
(Continued)

(58) Field of Classification Search
CPC ... F16K 31/004; F16K 31/08; G05D 16/2026; G05D 7/0641; Y10T 137/87265;
(Continued)

(56) References Cited

U.S. PATENT DOCUMENTS 3,586,045 A * 6/1971 Zimmer ............... A61M 16/10
                                                   137/505.18
4,338,965 A * 7/1982 Garnjost ............... F15B 20/001
                                                   137/554
(Continued)

FOREIGN PATENT DOCUMENTS

DE    30 09 273 A1    9/1981
DE    697 00 733 T2   3/2000
(Continued)

OTHER PUBLICATIONS

Yuan et al., "A Compact Broadband Omnidirectional Vertically Polarized VHF Antenna for Aircraft," Proceedings of the 40$^{th}$ European Microwave Conference, 2010, pp. 1480-1483.
(Continued)

*Primary Examiner* — William McCalister
(74) *Attorney, Agent, or Firm* — Crowell & Moring LLP

(57) ABSTRACT

A device for regulating pressure and/or mass flow of a gaseous or liquid fluid conveyed through a line in a space propulsion system includes a first, piezoelectrically actuatable regulating valve and at least two second, magnetically actuatable regulating valves. The regulating valves are connected to each other and to a line input in such a way that in a nominal mode the pressure and the mass flow of the fluid can be set by the first regulating valve, and a connection or isolation of the first regulating valve with or from the line input can be produced by the second regulating valves. In an emergency mode the pressure and the mass flow of the fluid can be set by the second regulating valves.

10 Claims, 2 Drawing Sheets

Figure 1:
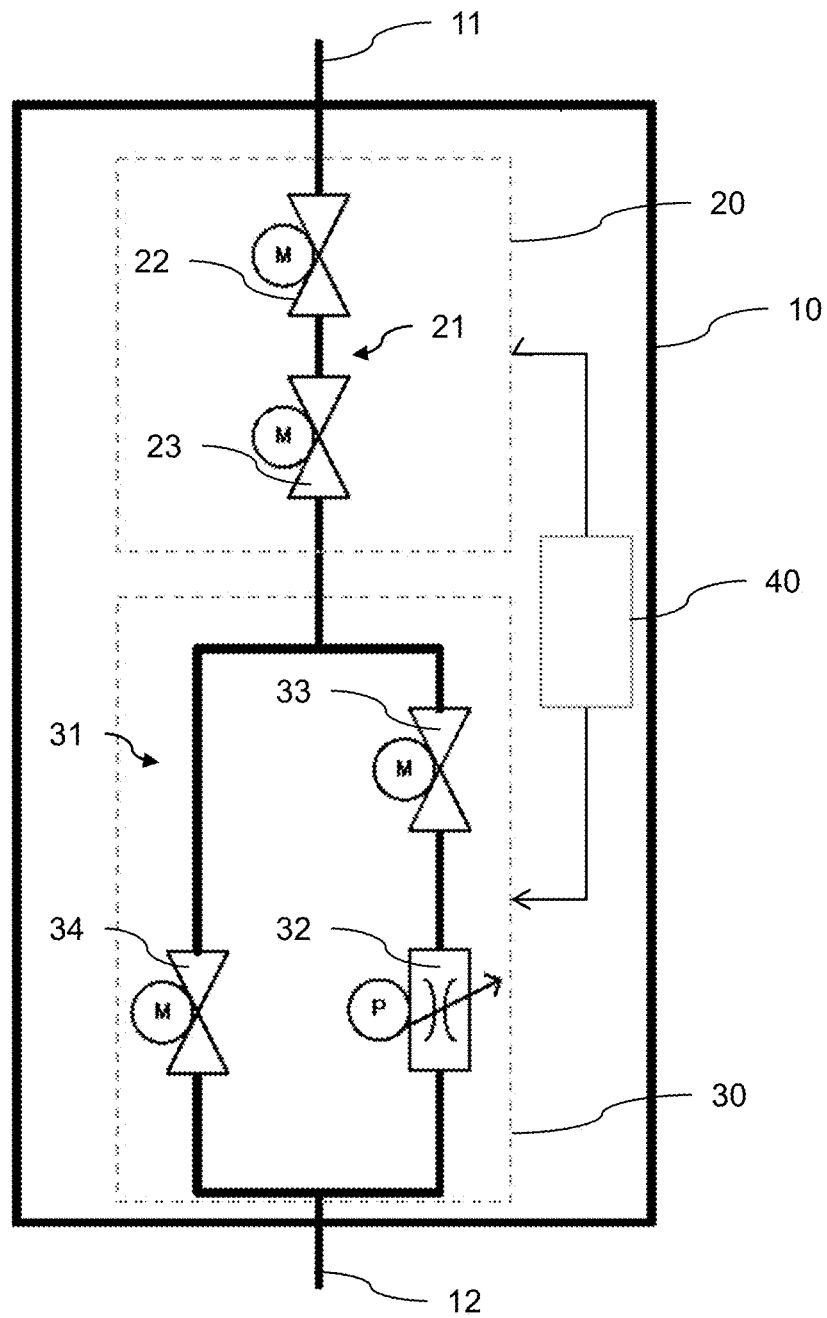

(51) Int. Cl.
   *G05D 16/20* (2006.01)
   *F16K 31/08* (2006.01)
(52) U.S. Cl.
   CPC .... *G05D 16/2026* (2013.01); *Y10T 137/8733* (2015.04); *Y10T 137/87314* (2015.04)
(58) Field of Classification Search
   CPC ..... Y10T 137/87298; Y10T 137/87306; Y10T 137/87314; Y10T 137/8733
   USPC ............ 137/599.01, 599.05, 599.06, 599.07, 137/599.09
   See application file for complete search history.

(56) References Cited

U.S. PATENT DOCUMENTS

| | | | | |
|---|---|---|---|---|
| 4,462,566 A * | 7/1984 | French | ................... | G05D 7/005 137/501 |
| 4,706,932 A * | 11/1987 | Yoshida | .............. | F15B 13/0405 137/596.16 |
| 4,838,037 A * | 6/1989 | Wood | ................... | F25B 41/062 251/129.05 |
| 4,848,393 A * | 7/1989 | West | ................... | F16K 11/0856 137/312 |
| 4,915,354 A * | 4/1990 | Sims, Jr. | ................... | F16K 1/42 251/334 |
| 5,094,260 A * | 3/1992 | Stuart | ................... | G05D 16/202 137/102 |
| 5,218,996 A * | 6/1993 | Schmitt-Matzon | ....... | B60T 8/36 137/596.17 |
| 5,326,070 A * | 7/1994 | Baron | ................ | F16K 31/0696 251/129.05 |
| 5,816,285 A | 10/1998 | Ohmi et al. | | |
| 6,046,685 A * | 4/2000 | Tubel | ................... | E21B 23/03 137/606 |
| 6,050,281 A * | 4/2000 | Adams | ................... | F23N 5/242 137/1 |
| 6,223,774 B1 * | 5/2001 | Fournier | ................. | F15B 18/00 137/487.5 |
| 6,990,991 B2 * | 1/2006 | Meckes | ................... | A62B 7/14 137/1 |
| 7,300,375 B2 | 11/2007 | Petrzik | | |
| 7,828,008 B1 * | 11/2010 | Beckman | ............ | F16K 37/0091 137/487.5 |
| 2003/0107016 A1 * | 6/2003 | Burrola | .............. | F02M 25/0836 251/129.15 |
| 2003/0172975 A1 * | 9/2003 | Gilbert | ..................... | F15C 5/00 137/599.07 |
| 2004/0250859 A1 | 12/2004 | Poulin et al. | | |
| 2005/0151103 A1 * | 7/2005 | Kubota | ............... | F02D 41/3845 251/129.15 |
| 2010/0116368 A1 * | 5/2010 | Khoshnevis | .............. | G01F 3/14 137/613 |
| 2012/0286522 A1 * | 11/2012 | Stahlkopf | ............... | F01K 13/02 290/1 R |

FOREIGN PATENT DOCUMENTS

| | | |
|---|---|---|
| DE | 103 20 524 A1 | 11/2004 |
| DE | 11 2004 000 757 T5 | 6/2006 |

OTHER PUBLICATIONS

Cumming et al., "Design Data for Small Annular Slot Antennas," Ire Transactions on Antennas and Propagation, pp. 1957-1958.
Clavijo et al., "Low-Profile Mounting Tolderant Folded-out Annular Slot Antenna for VHF Applications," IEEE, 2007, pp. 13-16.

\* cited by examiner

DEVICE FOR REGULATING THE PRESSURE AND/OR MASS FLOW FOR A SPACE PROPULSION SYSTEM

CROSS-REFERENCE TO RELATED APPLICATIONS

The present application claims priority under 35 U.S.C. §119 to German Patent Application No. 10 2012 017 501.9, filed on Sep. 5, 2012, the entire disclosure of which is herein expressly incorporated by reference.

BACKGROUND AND SUMMARY OF THE INVENTION

Exemplary embodiments of the present invention relate to a device for regulating the pressure and/or mass flow of a gaseous or liquid fluid, which can be conveyed through a line, in particular for a space propulsion system.

Mechanical pressure regulators are typically used for regulating the pressure and/or mass flow of gases or liquid mediums in a space propulsion system. An operating point, such as a control pressure, is set during manufacture of the mechanical pressure regulator. When such a pressure regulator is used in space applications, the components are often manufactured months or even years before the component is used in space. Subsequent changes in the operating point, in particular when the space component is already in orbit, are no longer possible or are possible only with considerable effort.

Exemplary embodiments of the present invention are directed to a device for regulating the pressure and/or mass flow in such a way that the device is improved in terms of design and function. Exemplary embodiments of the present invention provide a device for regulating the pressure and/or mass flow of a gaseous or liquid fluid that can be conveyed through a line. Such a device may be used, for example, in space propulsion systems of any kind in order to implement the supply of pressure to the mediums to be conveyed or for regulating the mass flow rates of mediums.

A combination of a first, piezoelectrically actuatable regulating valve and at least two second, magnetically actuatable regulating valves is provided for regulating the pressure and/or mass flow of the fluid. The regulating valves are connected to each other and to a line input in such a way that in a nominal mode the pressure and the mass flow of the fluid in the line can be set by means of the at least one first regulating valve, and a connection or isolation of the first regulating valve with or from the line input can be produced by means of the second regulating valves. In an emergency mode the pressure and the mass flow of the fluid in the line can be set by means of the second regulating valves.

The device can be used, in general, in all such areas, in which high pressure levels at the line input are to be reduced to low pressure levels at a line output by means of the device.

In contrast to conventional mechanical pressure regulators, the device of the present invention is based on an electric control of a plurality of valves. The regulating of the pressure and/or mass flow of the fluid to be conveyed is achieved by a combination of solenoid valves and piezo valves. Exemplary embodiments of the present invention employ the solenoid valves for both regulating and shutting off.

One advantage of the device is the fact that the operating point, for example a control pressure, can be set by means of software at a later point in time. In the extreme case the setting of the operating point can take place when the device is used in a space propulsion system, even in orbit. The ability to change the operating point allows for realization of various applications. For example, the device can be used in supplying pressure to electric, chemical or cold gas propulsion systems or for regulating the mass flow rate in electric drive systems.

An additional advantage of the device is that due to the high degree of tightness, which is achieved by means of the solenoid valves, it is possible to significantly extend the operating time in orbit, possibly even until the end of a mission. In contrast to conventional devices, the proposed device exhibits a longer and more efficient operation, a feature that is an economic factor for an operator of a space device. This more efficient operation is due to the fact that in a conventional device the mechanical regulators are permanently isolated once a space component has been positioned, and a remaining propellant is pumped out with the residual pressure in the tank. As a result, the space propulsion system is not operated at the optimal operating points and consequently exhibits lower efficiency.

In addition to the above described advantage, it is possible to take any necessary corrective action in the event of anomalies in the space propulsion system.

In particular, it is possible to switch the device over into an emergency mode, in order to ensure the regulating process by means of the solenoid valves, even if the piezoelectric regulating valve that is used for regulating the pressure and/or mass flow has failed. In the normal mode the device can be precisely reset by means of the piezoelectric regulating valve, because this regulating valve exhibits a proportional opening characteristic. Of course, such a precise regulating process is not possible with the use of the solenoid valves in the emergency mode because these solenoid valves do not exhibit a proportional opening characteristic. Instead, these solenoid valves can only be opened or closed. Nevertheless, an emergency mode can be maintained in the event of a malfunction.

In a first variant, one of the second regulating valves is connected in series with the first regulating valve between the line input and the regulating valve. Another one of the second regulating valves is connected in parallel to the first regulating valve. This design variant enables a "bypass" of the first regulating valve, if, for example, this first regulating valve can no longer be opened.

On the other hand, when the device is isolated, according to the specifications, from the line input (i.e. no fluid is conveyed to a consuming component), the tightness of the device can be enhanced in a targeted way by connecting in series a second regulating valve with the first regulating valve.

In an additional variant, one of the second regulating valves is connected in series with the first regulating valve between the line input and the regulating valve. Another one of the second regulating valves is connected in parallel to the series connection consisting of the first regulating valve and the one of the second regulating valves. This variant makes it possible to separate a first regulating valve, which can no longer be closed, from the line input by means of the series connected second regulating valve and to make a connection between the line input and a line output by means of the parallel connected second regulating valve.

According to a second design variant, the first and the at least two second regulating valves are assigned to a regulating unit. The regulating unit is connected to the line input by way of a supply unit. The supply unit has at least one third, magnetically actuatable regulating valve for connecting or separating the regulating unit to or from the line input. By providing the supply unit between the line input and the regulating unit, which can be configured according to the above described design variants, it is possible to improve the tightness of the device in the event that it is necessary to separate the regulating unit from the line input.

In order to be able to generate a high degree of tightness of the device, even in the case of a defect of a third regulating valve of the supply unit the supply unit can comprise at least two third regulating valves that are connected in series to each other.

In an additional embodiment the regulating unit comprises a first valve train and, connected in parallel thereto, at least one second valve train with the first and second regulating valves respectively. The first valve train constitutes a primary branch, and the at least one second valve train, which is connected in parallel to the first valve train, constitutes a redundant branch. As a result, the reliability of the device is guaranteed even if the complete valve train malfunctions.

Corresponding hereto, the supply unit can comprise a third valve train and, connected in parallel thereto, at least one fourth valve train with the third regulating valve or third regulating valves respectively. In this case the third valve train constitutes a primary branch, and the at least one fourth valve train, which is connected in parallel to the third valve train, constitutes a redundant branch.

The number of redundant branches in the regulating unit and/or the supply unit can be selected as a function of the desired fail safety of the device.

Similarly it is possible, according to one embodiment, to form the first and the second valve train of the regulating unit in an identical way or in a different interconnection of the first and second regulating valves. For this purpose, in particular, the two design variants described above may be considered.

Furthermore, the first and the at least two second regulating valves can be actuated by a control unit. The control unit comprises driver electronics, which sets off the target and actual values of the pressure in the line and then from the results computes and executes the actuation of the various regulating valves. In particular, in this case the control unit for controlling the regulating valves of the device can be fed the target values and the measurement values of the pressure and/or the mass flow of the fluid.

BRIEF DESCRIPTION OF THE DRAWING FIGURES

The invention is explained in detail below by means of the exemplary embodiments in the drawings. The drawings illustrate in FIG. 1 a first exemplary embodiment of an inventive device for regulating the pressure and/or mass flow, and FIG. 2 a second exemplary embodiment of a redundant device for regulating the pressure and/or mass flow.

DETAILED DESCRIPTION

FIG. 1 illustrates a first exemplary embodiment of an inventive device 10 for regulating the pressure and/or mass flow. The device 10 comprises a line input 11, which is connected to a fluid reservoir (not illustrated) by way of, for example, of a line or a line system, which is also not illustrated. From the fluid reservoir a gaseous or liquid fluid is conveyed with an input pressure to the line input 11. At a line output 12, which is coupled, for example, directly or via additional components (not illustrated) with a space propulsion system, which is also not illustrated in more detail, the fluid is made available with an output pressure that is reduced with respect to the input pressure. The pressure and/or the mass flow rate of the fluid is reset to the value, according to specifications, at the line output by means of the device 10.

Functionally the device 10 comprises, besides a control unit 40, a regulating unit 30 and a supply unit 20.

The supply unit 20, which is connected to the line input 11, connects the regulating unit 30 to the line input 11 or to separate the regulating unit 30 from the line input 11. The main task of the regulating unit 30 consists of regulating the pressure. The control unit 40 comprises the driver electronics for actuating the components of the supply unit 20 as well as the components of the regulating unit 30, and these components shall be described in more detail below. In particular, the control unit 40 is fed the target and actual values of the pressure applied to the line connected to the line input 11, the target and actual values of the pressure applied to the line connected to the line output 12, as well as the values applied to the states of the regulating valves of the supply unit 20 and the regulating unit 30, and these values are set off against each other. From the results the actuating values for the regulating valves of the supply unit 20 and the regulating unit 30 are determined.

The regulating unit 30 comprises, besides a piezoelectrically actuatable regulating valve 32, at least two magnetically actuatable regulating valves 33, 34. The piezoelectrically actuatable regulating valve 32 shall also be referred to hereinafter as the piezo regulating valve. The magnetically actuatable regulating valves 33, 34 are referred to as the solenoid valve. The magnetically actuatable regulating valves 33, 34 constitute the shut-off and regulating valves. In the embodiment shown in FIG. 1, the piezo regulating valve 32 and the solenoid valve 33 are connected in series to each other. The solenoid valve 34 is connected in parallel to the series connection of the regulating valves 32, 33. This valve train, which is marked with the reference numeral 31, is interconnected between the supply unit 20 and the line output 12.

The supply unit 20 comprises two solenoid valves 22, 23, which are connected in series to each other. The series connection of the two regulating valves 22, 23 constitutes a valve train 21, which is interconnected between the line input 11 and the regulating unit 30. The series connected solenoid valves 22, 23 as well their series connection with the regulating unit 30 make it possible to enhance the tightness of the device, in particular the tightness of the piezo valve 32 that is provided for regulating the pressure.

FIG. 1 shows that the interconnection of the regulating valves 32, 33, 34 of the regulating unit 30 makes it possible to set the pressure and/or mass flow of the fluid by means of the piezo regulating valve 32 in a nominal mode. In the nominal mode of the device 10, the solenoid valves 22, 23 and 33 are opened (through suitable actuation by the control unit 40), while the solenoid valve 34 is closed. The pressure and/or mass flow is precisely regulated by actuating the piezo regulating valve 32. Hence, in the nominal mode this continuous regulating of the piezo regulating valve is used to achieve a precise control quality. In particular, it is possible to set the operating point of the device, i.e. to set a desired regulating pressure and/or mass flow, in the desired way at any time.

In an emergency mode, the pressure of the mass flow can be set with reduced control quality by means of the solenoid valve 34. In this case the then defective piezo regulating valve 32 is decoupled from the line input 11 by way of the solenoid valve 33. Basically the following four fault scenarios are conceivable, when the device 10 is running.

1. The piezo regulating valve does not open.
2. The piezo regulating valve does not close.

In the fault scenario 1, in which the piezo regulating valve 32 does not open, the piezo regulating valve 32 is isolated from the line input 11 due to the closing of the solenoid valve 33. Opening the solenoid valve 34 initiates an emergency regulating mode.

In the fault scenario 2, in which the piezo regulating valve 32 does not close contrary to a desired actuation, the solenoid-operated regulating valve 32 is isolated due to the closing of the solenoid valve 33. The result is an emergency regulating mode with the solenoid valve 34.

If the intent is to regulate the pressure by means of the device 10, then the solenoid valves 22, 23 of the supply unit 20 remain open.

Figure 2:
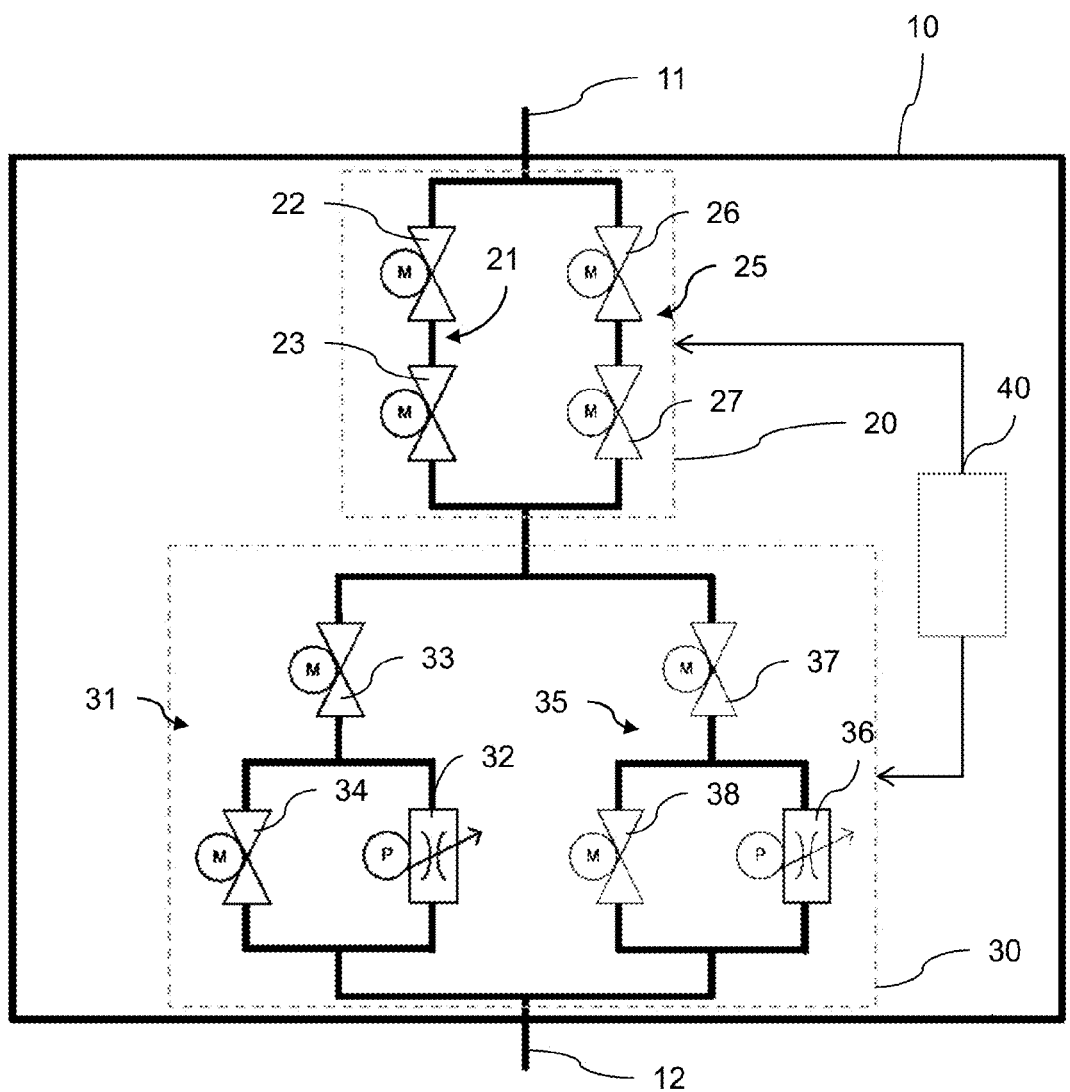

FIG. 2 shows a second exemplary embodiment of a redundant device 10 for regulating the pressure and/or the mass flow. In this case both the supply unit 20 and the regulating unit 30 comprise in each instance two valve trains 21, 25 or 31, 35 respectively, of which one (21 or 31) serves as the primary branch, and the other (25 or 35) serves as the redundant branch.

In the supply unit the redundant branch 25 comprises in accordance with the primary branch 21 two solenoid valves 26, 27 that are connected in series to each other. The primary branch 21 and the redundant branch 25 are connected in parallel to each other.

Similarly two parallel connected valve trains 31, 35 are shown in the regulating unit 30. In this case these valve trains could exhibit the interconnection shown in FIG. 1. For this purpose FIG. 2 shows possible alternatives, in which the piezo regulating valve 32 or 36 respectively is connected to a solenoid valve 34 or 38 respectively. The parallel connection of the regulating valves 32, 34 or 36, 38 respectively is connected in series to a solenoid valve 33, 37. The two branches 31, 35 that are connected in parallel are interconnected in the way described above between the supply unit 20 and the line output 12.

In an additional modification, which is not illustrated, the valve trains 31, 35 of the device, according to FIG. 2, could also be formed in a different way. Thus, for example, the valve train 31 could be configured as shown in FIG. 1, and the valve train 35 could be configured as shown in FIG. 2.

Basically the following four fault scenarios are conceivable, when the device 10 is running.

1. The piezo regulating valve does not open.
2. The piezo regulating valve does not close.
3. One of the solenoid valves does not open.
4. One of the solenoid valves does not close.

The fault scenarios are redressed by suitably actuating the regulating valves. In the fault scenarios described below, a constant control quality is achieved, despite the occurring fault, through the use of redundancies. An "emergency mode" is compensated with quality losses by means of a non-continuous regulating process by means of one of the solenoid valves. In the nominal mode of the device 10, a constant regulating process by means of the piezo regulating valves 32, 36 is used in order to achieve the high control quality. In the following description it is assumed that the respective primary branches 21 and 31 of the supply unit 20 and the regulating unit are active until the occurrence of the fault scenario, while the redundant branches 25, 35 are inactive.

In the fault scenario 1, in which the piezo regulating valve 32 of the primary branch 31 no longer opens, the primary branch is isolated from the line input 11 due to the closing of the solenoid valves 33, 34. Opening the solenoid valve 37 and actuating the piezo regulating valve 36 causes a switch-over to the redundant branch 35, as a result of which the high control quality is maintained.

In the fault scenario 2, in which the piezo regulating valve 32 of the primary branch 31 no longer closes, the piezo regulating valve 32 is isolated due to the closing of the solenoid valves 33, 34. The result is a switch-over to the parallel regulating branch 35. In this case the solenoid valve 37 is opened, and the solenoid valve 38 is closed. The regulating process is implemented by actuating the piezo regulating valve 36.

In a fault scenario, in which both piezo regulating valves 32, 36 of the primary branch 31 and the redundant branch 35 no longer open (i.e. even the redundant branch 35 is not working according to the specifications), the redundant branch 35 is isolated from the line input 11 due to the closing of the solenoid valves 37, 38. The result is an emergency regulating mode by way of the solenoid valves 33, 34 of the primary branch 31. It goes without saying that the primary branch 31 could also be isolated from the line input 11, and an emergency regulating mode by way of the solenoid valves of the redundant branch could take place.

In a fault scenario, in which the piezo regulating valves 32, 36 of both the primary branch 31 and the redundant branch 35 no longer close, the piezo regulating valve of one of the branches, for example, the redundant branch 35, is isolated due to the closing of the solenoid valves 37, 38. Upon opening the solenoid valve 34 of the primary branch 31, an emergency regulating mode can be initiated by actuating the solenoid valve 33. Then the fluid can flow through both the opened solenoid valve and through the piezo regulating valve 32, which can no longer be closed.

When one of the supply branches malfunctions, there ensues an isolation of the defective valve branch with a simultaneous switch-over to the parallel supply branch.

The device is capable of precisely regulating the pressure levels and the mass flow rates by means of the arrangement of various solenoid valves and piezo regulating valves, connected to a corresponding electronic actuator, by means of a control unit. The result of this combination of simple, reliable solenoid valves and precisely adjustable piezo regulating valves is a high degree of control precision and a reliable tightness of the system in the case of a nominal mode.

Depending on the needs of the system that is to be pressurized or regulated, the regulating parameters, corresponding to the control unit, such as the pressure levels or the mass flow rates, can be preset in the control unit. In so doing, it is possible to compensate for any kind of fault scenario through built-in redundancies or emergency modes, a feature that significantly reduces a total failure of the regulating process.

The device can be used as an alternative to the conventional mechanical regulators because of its multi-faceted applicability and parameterization that can be changed when the device is used in space, even during a mission. Similarly the device could also be used in other industrial sectors.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS 10 device for regulating pressure and/or mass flow
11 line input
12 line output
20 supply unit
21 third valve train/primary branch
22 magnetically actuatable regulating valve
23 magnetically actuatable regulating valve
25 third valve train/redundant branch
26 magnetically actuatable regulating valve
27 magnetically actuatable regulating valve
30 regulating unit
31 first valve train/primary branch
32 piezoelectrically actuatable regulating valve/piezo regulating valve
33 magnetically actuatable regulating valve/solenoid valve
34 magnetically actuatable regulating valve
35 first valve train/primary branch
36 piezoelectrically actuatable regulating valve
37 magnetically actuatable regulating valve
38 magnetically actuatable regulating valve
40 control unit

What is claimed is:

1. A device for regulating at least one of the pressure and mass flow of a gaseous or liquid fluid conveyable through a line of a space propulsion system, the device comprising:
a first, piezoelectrically actuatable regulating valve; and
at least two second, magnetically actuatable regulating valves,
wherein the combination of the first, piezoelectrically actuatable regulating valve and the at least two second, magnetically actuatable regulating valves are configurable to regulate at least one of the pressure and mass flow of the fluid,
wherein the first, piezoelectrically actuatable regulating valve and the at least two second, magnetically actuatable regulating valves are connected to each other and to a line input in such a way that in a nominal mode the pressure or the mass flow of the fluid is settable by the first, piezoelectrically actuatable regulating valve, and a connection or isolation of the first, piezoelectrically actuatable regulating valve with or from the line input is produced by the at least two second, magnetically actuatable regulating valves, and wherein in an emergency mode the first, piezoelectrically actuatable regulating valve is isolated from the line input such that the pressure or the mass flow of the fluid is settable by only the at least two second, magnetically actuatable regulating valves,
wherein the emergency mode corresponds to a malfunction of the first, piezoelectrically actuatable regulating valve.

2. The device as claimed in claim 1, wherein one of the at least two second, magnetically actuatable regulating valves is connected in series with the first, piezoelectrically actuatable regulating valve between the line input and the first, piezoelectrically actuatable regulating valve, and another one of the at least two second, magnetically actuatable regulating valves is connected in parallel to the first, piezoelectrically actuatable regulating valve.

3. The device as claimed in claim 1, wherein one of the at least two second, magnetically actuatable regulating valves is connected in series with the first, piezoelectrically actuatable regulating valve between the line input and the first, piezoelectrically actuatable regulating valve, and another one of the at least two second, magnetically actuatable regulating valves is connected in parallel to the series connection consisting of the first, piezoelectrically actuatable regulating valve and the one of the at least two second, magnetically actuatable regulating valves.

4. The device as claimed in claim 1, wherein the first, piezoelectrically actuatable regulating valve and the at least two second, magnetically actuatable regulating valves are part of a regulating unit, the device further comprising:
a supply unit, wherein the regulating unit is connected to the line input by way of the supply unit, and the supply unit has at least one third, magnetically actuatable regulating valve configurable to connect or separate the regulating unit to or from the line input.

5. The device as claimed in claim 4, wherein the supply unit comprises at least two third regulating valves connected in series to each other.

6. The device as claimed in claim 4, wherein the regulating unit comprises a first valve train and a second valve train connected in parallel with the first valve train, wherein the first and second valve trains each comprise the first, piezoelectrically actuatable regulating valve and the at least two second, magnetically actuatable regulating valves.

7. The device as claimed in claim 4, wherein the supply unit comprises a third valve train and a fourth valve train connected in parallel with the third valve train, wherein each of the third and fourth valve trains includes a pair of series connected magnetically actuatable regulating valves.

8. The device as claimed in claim 1, further comprising:
a control unit, wherein the control unit is configured to actuate the first, piezoelectrically actuatable regulating valve and the at least two second, magnetically actuatable regulating valves.

9. The device as claimed in claim 8, wherein the control unit is configured to receive target values and measurement values of the pressure or the mass flow of the fluid.

10. The device as claimed in claim 1, wherein the device is configured to regulate the at least one of the pressure and mass flow through the line of the space propulsion system.

* * * * *